Nov. 12, 1968    J. D. DELL    3,410,752
GAS COOLED NUCLEAR REACTOR
Filed June 22, 1966    7 Sheets-Sheet 1

Nov. 12, 1968  J. D. DELL  3,410,752
GAS COOLED NUCLEAR REACTOR
Filed June 22, 1966  7 Sheets-Sheet 2
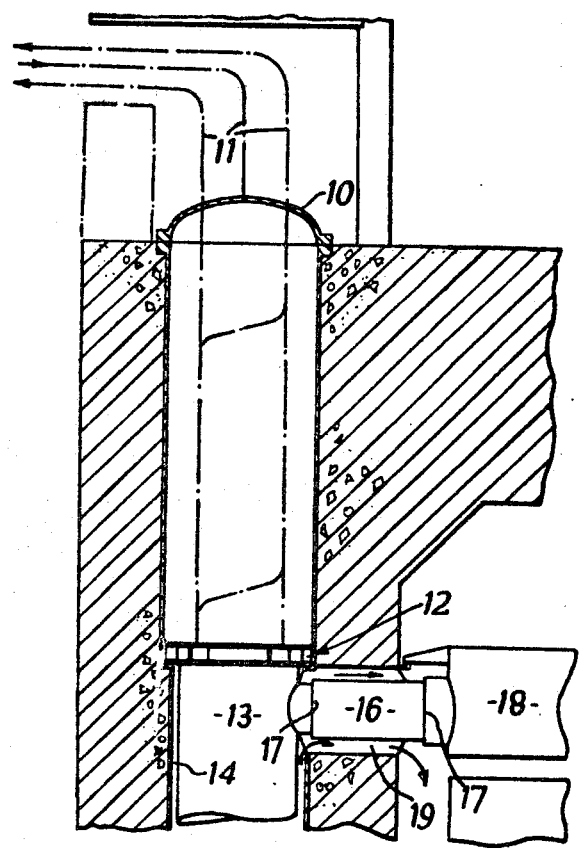
Fig. 2.
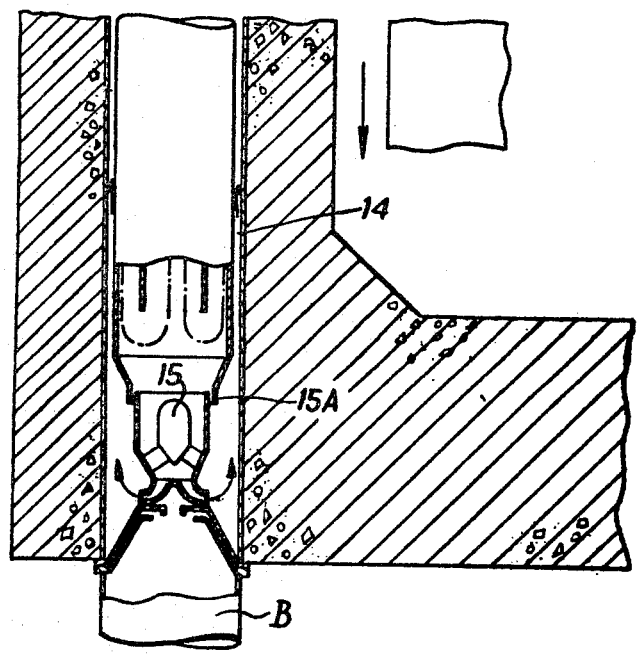

United States Patent Office 3,410,752
Patented Nov. 12, 1968

3,410,752
GAS COOLED NUCLEAR REACTOR
John D. Dell, Henley-on-Thames, Oxfordshire, England, assignor to Babcock & Wilcox Limited, London, England, a corporation of Great Britain
Filed June 22, 1966, Ser. No. 559,457
Claims priority, application Great Britain, June 22, 1965, 26,263/65
8 Claims. (Cl. 176—60)

ABSTRACT OF THE DISCLOSURE

A gas cooled nuclear reactor having a concrete wall and a plurality of heat exchangers fitted in penetrations formed in the wall from the outer surface thereof so as to be individually removable therefrom for servicing. The penetrations form mouths in the outer surface of the wall through which the exchangers are passed for fitting within the penetration. Each penetration mouth is closed by a closure mounted on the exchanger that also acts as a head for the exchanger. An added feature of the invention is to provide a circulating fan mounted in a wall cavity for circulating primary coolant through each heat exchanger while secondary coolant is circulated once through the exchanger. Other added features are to provide a layer of spent primary coolant intermediate the exchanger and penetration wall for insulating purposes, providing a centrifugal circulating fan, and providing helically coiled reheater coils carried by the closure for first heating incoming primary coolant.

---

This invention relates to a nuclear reactor having its reactive core cooled by gas flow and contained in a pressure vessel.

It is frequently desirable that it should not be the gas itself that carries the heat of reaction away from the pressure vessel, but that a secondary coolant fluid perform this function. To this end, according to already proposed arrangements, a heat exchanger is located within the pressure vessel and is used for thermal exchange between the gas and a secondary coolant fluid, usually water, which enters and leaves the vessel by means of pipes passing through the side wall thereof, to pass through the exchanger.

According to this invention, a gas cooled nuclear reactor comprises a pressure vessel containing the reactive core, a heat exchanger located within a penetration in the wall of the vessel, means to circulate the gas, as the primary coolant, between the reactive core and the heat exchanger, and inlet and outlet tubes passing from the penetration to the exterior of the vessel, by which to conduct a secondary coolant through the heat exchanger, for conveying the heat of reaction from the vessel.

Nuclear reactor heat transfer arrangements incorporating the invention in various aspects will now be described with reference to the accompanying somewhat diagrammatic drawings, in which:

FIGURE 2 is a sectional elevation on another pressure vessel wall, also showing the casing of a heat exchanger, the casing being partly broken away, and some detail of parts within the vessel;

Figure 1:
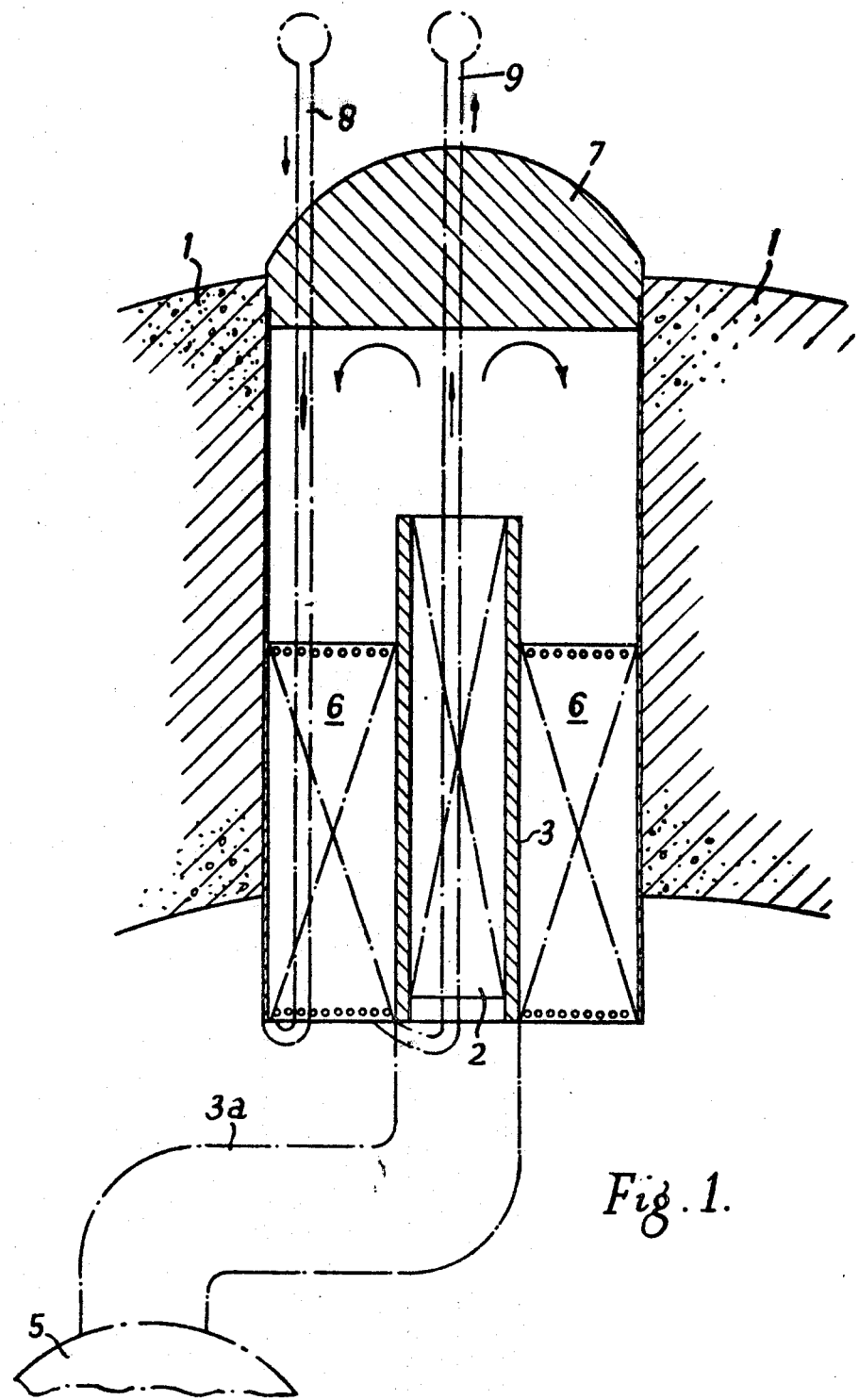
FIGURE 1 is a horizontal section through a portion of the wall of a pressure vessel, showing a heat exchanger installed in a penetration of the wall.

Referring to FIGURE 1, there is shown a horizontal section through a concrete wall 1 of a pressure vessel at a level coinciding with the axis of a cylindrical penetration in the wall. The axis is horizontally disposed and also forms the axis of a once through cylindrical vapour producing and heating tube bank arrangement, which fits closely into the penetration.

The tube bank arrangement shown in FIGURE 1, which may of course be substituted for by other form of heat exchanger, includes a central superheater coil 2 lying within a cylindrical baffle 3 connected by ducting 3a to conduct heated gases as direct as possible from the fissile core of a nuclear reactor schematically shown at 5 to the baffle. In this, and all the embodiments described below, gas is the primary coolant, while water is circulated as a secondary coolant in the tube banks to produce vapour when heated by the gas.

The vapour thus conveys the heat of reaction away from the reactor vessel for utilisation elsewhere.

The baffle 3 is surrounded in the cylindrical cavity by economizer tube banks 6, and the space between this superheater and economizer portion and a closure plug 7 is filled with an evaporator portion, consisting of further tube banks (not shown) whereat liquid water preheated in the economizer portion is evaporated before being superheated in the coil 2.

After passing over the superheater in the cylindrical baffle 3 the gas changes direction in the evaporator portion, as indicated by the arrows, continues its path through the evaporator coils, and then, leaves the heat exchanger via the economizer coils 6, whence it is led back, having cooled down to about 300° C., to the core again to be heated up again to about 675° C. and to recommence its passage through the tube banks.

Water, as the secondary working fluid, is circulated in the opposite direction to the gas flow between an inlet header and an outlet header from which inlet and outlet pipes 8 and 9 pass through insulated and cooled penetrations of the plug 7, so that when at its hottest the water, as steam in the superheater 2, encounters the gases also at their hottest. The economizer, evaporator and superheater in this embodiment all consist of spiral tube banks.

Only the cavity and heat exchanger unit are shown in FIGURE 1 but sixteen such cavities and units are actually equispaced around the circumference of the round sectioned pressure vessel, with the water/steam piping arranged in four isolatable circuits to give some degree of safety in the event of breakdowns: individual units are fairly easily replaceable.

The heat exchanger units can be constructed independently of the vessel construction, so that boiler erection can be removed from the programme critical path. Moreover, the heat exchanger unit is readily accessible for servicing and replacement by removal of the plug 7.

In this embodiment, the tube arrangement is, overall, about 20 feet long and 6 feet wide, and projects somewhat inward of the cavity as shown, being contained in a cylindrical liner having these dimensions and fitting into the cavity. Some form of biological shielding (not shown) is provided outside the closure plug 7. The external mouth of the cavity closed by this closure plug has the same diameter as the rest of the cavity, so that the boiler can be installed therethrough, or similarly removed for servicing.

The inlet and outlet headers are positioned externally of the wall to permit easy access for inspection of flow proportioning ferrules in the tube inlets and for plugging the ends of any defective tubes, allowing flow to continue through other tubes connected in parallel.

Circulating fans for the gas coolant may be located in further cavities in the pressure vessel wall situated below the level of the heat exchanger cavities and so not visible in FIGURE 1.

The embodiment of FIGURE 2 differs from that just described in a major aspect in that the heat exchanger is now housed in a vertical cylinder, spaced from the walls of the penetration in the pressure vessel by a gas flow space. Also access is now to be had from the top of the pressure vessel by removal of a flanged lid 10 through which the steam exit and cold water feed pipes 11, shown in broken lines, pass.

There are twelve similar such vertical cavities uniformly distributed in the side walls of the concrete pressure vessel around the central space A containing the reactor core (not shown). The contents of the cavities are similarly accessible by removal of flanged lids 10. The cavities each have a step 12 below which the diameter is smaller and on which rests the upper flanged end 12 of a casing 13. This casing is slightly smaller in diameter than the surrounding cavity wall to provide an annular interval 14 thus allowing a return flow path for spent cooling gas, as described below.

The casing contains tube banks for penetrating, vapourising and superheating water, distribution headers, and also insulating partitions by which gas is constrained to flow in heat exchange relationship with the tube banks, entering at the top through the lateral duct 16 and leaving at the bottom after flowing past an adjustable flow control vane 15. Just above the vane 15 can be seen an expansion joint 15A of the sliding telescope.

The gas flow through the heat exchanger is promoted by means of a fan in this instance a centrifugal blower positioned at the base of each channel. Only the nozzle is visible in FIGURE 2 and is indicated at B. The fan draws gas down past the tube banks and discharges it up through the annulus 14 between the tube bank casing 13 and the cavity wall.

The use of a centrifugal, rather than an axial, blower fan enables a greater volume for a given cavity size to be available for the heat exchanger tube banks. A further advantage of the above arrangement is given by having only spent, cooled gas adjacent with the cavity wall, or liner if one is used, since the insulation of the pressure vessel wall is thus heated to a minimum, and so can be less thick.

The cavity and boiler thus present coaxial passages for gas flow, downwardly in the centre and upwardly in the annulus; the gas connections to the nuclear reactor are also coaxial in form, since the boiler input is taken via a central tube 16 housing sliding expansion joints 17, from a hot box 18. This collects the gas directly after being heated in the reactor core (not shown) emerging from the top thereof. Around the central tube 16 is an annular path 19 which conducts gas from the annulus 14 to the bottom of the reactor core whence it flows through the core again to be reheated. In a modification, the connection from the annulus 14 may be taken from the top of the cavity, above the step, in which case the path 19 need not be provided but provision must be made for the flow of coolant past the flange 12. This modification, however, requires an extra duct through the vessel wall whilst the wall is not protected from the hot gases as in the case with the illustrated embodiment in which cool gases flow through the annular path 19.

Figure 3:
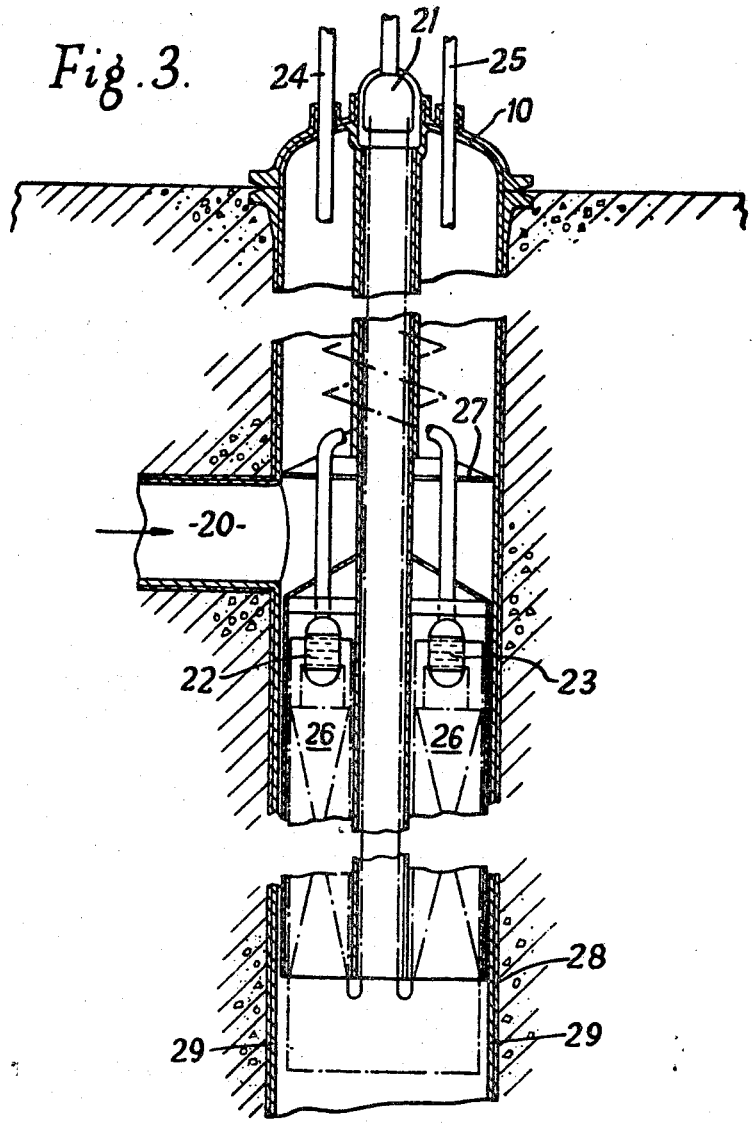
FIGURES 3, 4, 5 and 6 show respectively, in sectional elevation types of heat exchanger in pressure vessel wall penetrations.

In the embodiment shown in FIGURE 3, the secondary fluid flows in only one direction within the cavity and returns to the core from the lower end of the cavity. Thus the passages around the water boiler tube arrangement and around the inlet hot gas path referenced 20 in FIGURE 3, are not provided. As before, however, the tube arrangement is located in an upright cavity within a pressure vessel (not shown) and is similarly positioned relatively to the reactor core. The water and steam tubes are again taken through the flanged head 10 at the top of the cavity.

The cold water inlet headers shown at 21, are located in the head 10 instead of as in FIGURE 2 within the cavity. This allows individual inlet tubes becoming defective to be immobilised, by blocking them off, at the top, whereas only the input to the relevant header is accessible in FIGURE 2 within major dismantling. The superheater headers of which two are visible at 22 and 23, are, however, situated below with their outlets 24 and 25 passing through the flanged head 10.

The heat exchanger portion 26 is helically wound on a level below the hot gas path 20, gas therefrom being diverted downward by means of a gas baffle 27, and being returned to the core from an outlet (not shown) at the lower end of the cavity. A line 28 lines the penetration wall, and a layer of insulation 29 separates the heat exchanger jacket from the liner. A layer of water cooled tubes is embedded in the concrete adjacent to the liner 28.

Figure 4:
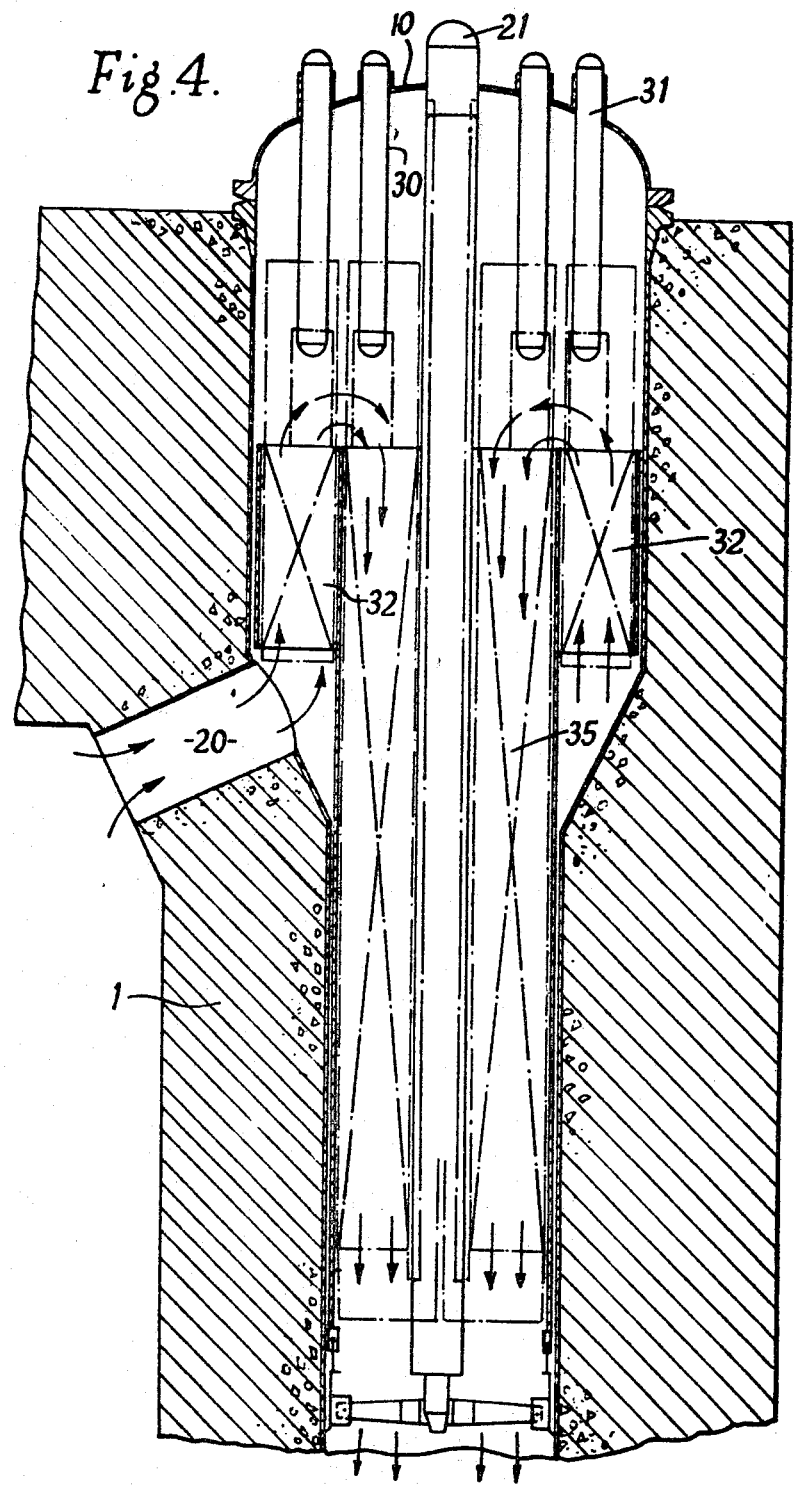
Figure 5:
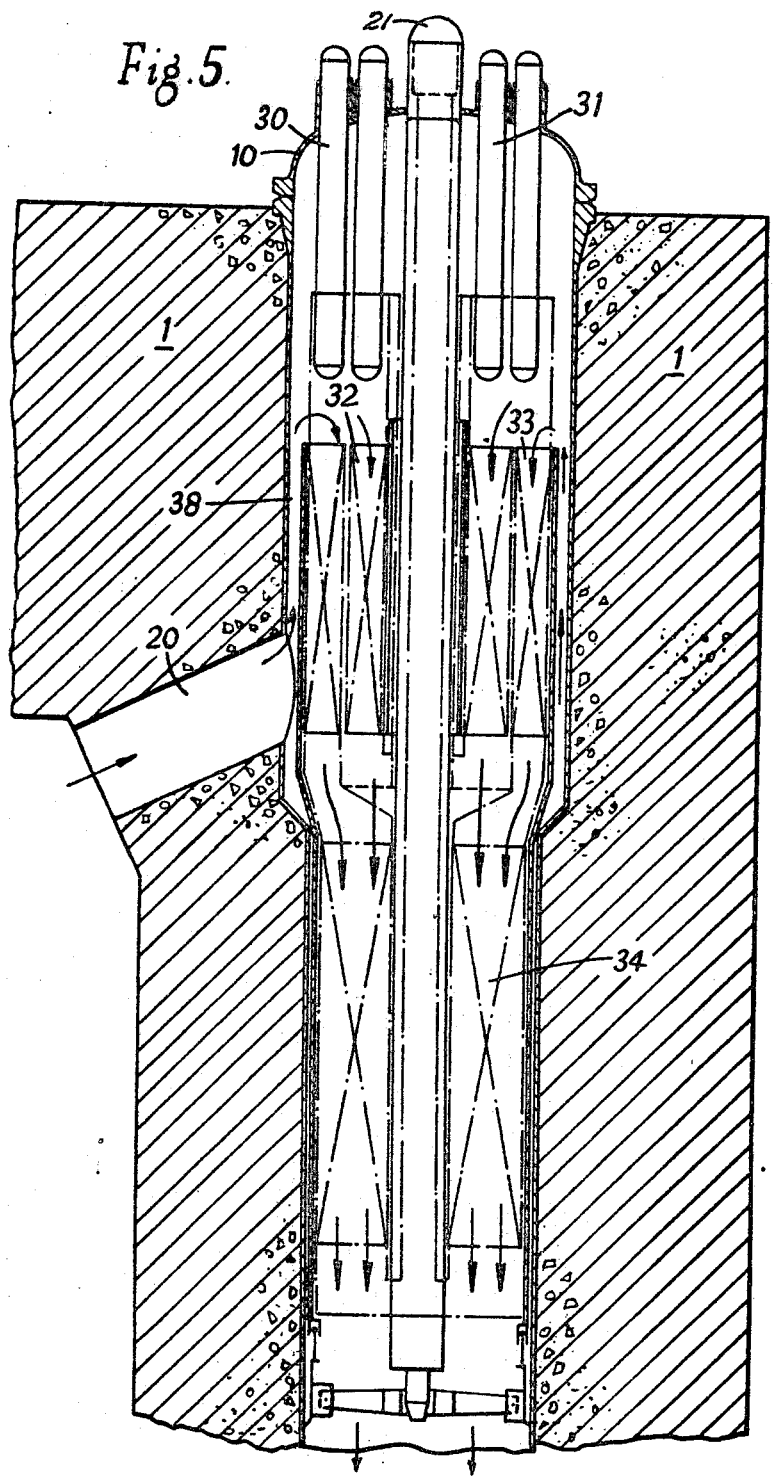
Figure 6:
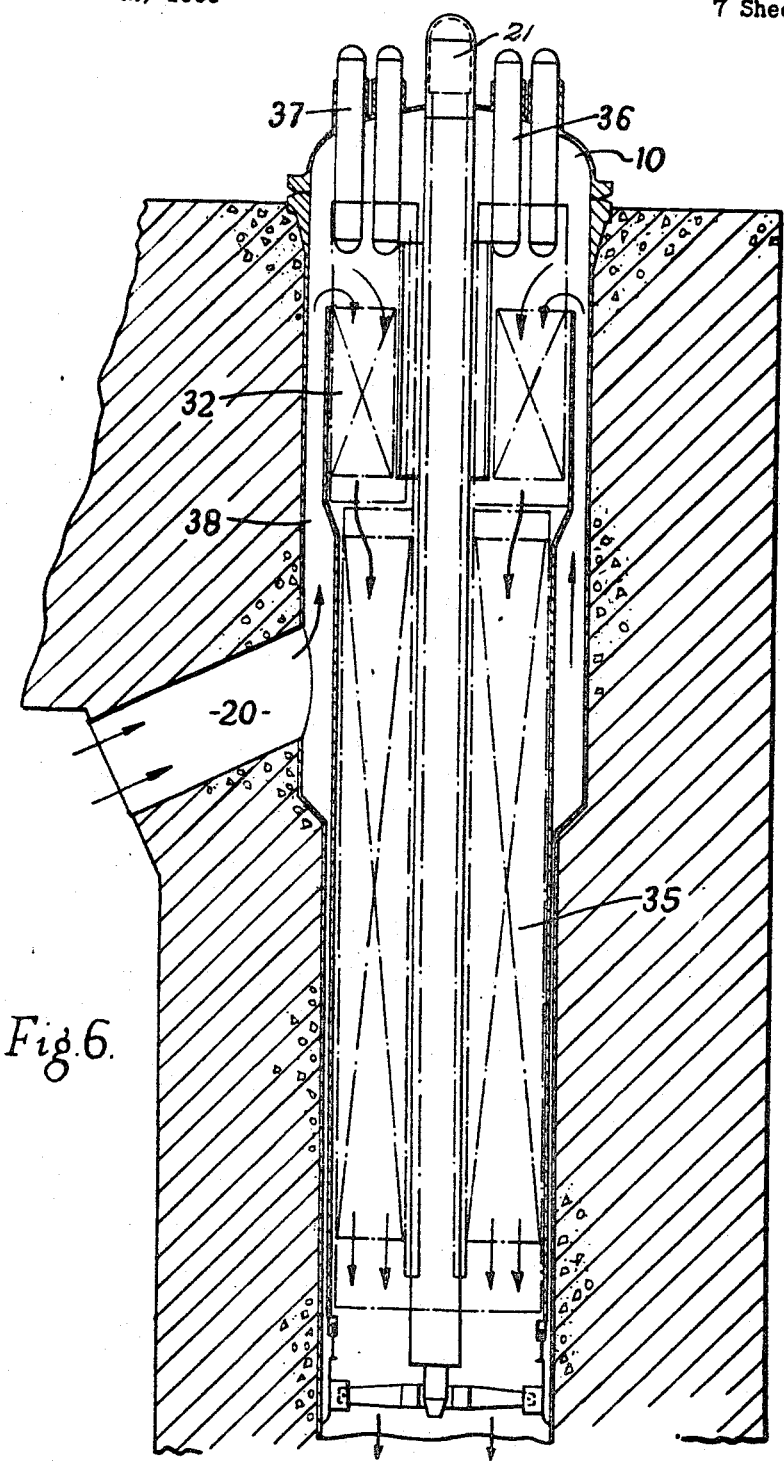

The embodiments of FIGURES 4, 5 and 6 differ from that shown in FIGURE 3 in having also reheater coils, arranged in the three embodiments in alternative positions. The flanged cover member 10 carries all the reheater headers.

Referring to FIGURE 4, the cold water inlet 21 is set in the centre of the flanged lid, being surrounded on an inner ring of four superheater outlet headers 30 and an outer ring of eight reheater headers 31, four inlet and four outlet. The reheater helical coils 32 surround the top part of the remaining tube arrangement and receive the incoming gases first from inlet 20, which is shaped to direct the gases upward through the reheater, the gases then flow downwards, as seen by the arrows, first through the upper superheater portion and then the lower and cooler evaporator portion against the water of the remaining tube banks 35 steam flow, until it is returned to the core by a blower at a level below that visible in FIGURE 4.

To accommodate the reheater coil, the diameter of the cavity is widened above the gas inlet port 20.

FIGURE 5 differs from FIGURE 4 in that this embodiment has the superheater 33 helically wound on the outside of the similarly wound reheater 32, and the ring of four superheater outlet headers 30 correspondingly surrounds the ring of eight reheater inlet and outlet headers 31 in the flanged cover 10. Another difference is that the incoming gas from port 20 ascends an outer annulus 38 outside the superheater 33 before being deflected downwards along parallel paths through the reheater and superheater, which converge below to traverse the helical evaporator and economiser section 34. It will be appreciated that in this arrangement, gas flow is downwards in centraflow to the fluid in all coils.

FIGURE 6 shows another arrangement generally similar to the last two. The reheater 32 is encountered first of all by the incoming gases, as was the case in the embodiment of FIGURE 4, while the gases travel always downwards while cooling, as was the case in FIGURE 5. The reheater is now situated above the remaining tube banks 35. The cover 10 carries as before the superheater outlet and the reheater headers; in this case the inner header ring 36 surrounding the centrally located water inlet header 21 contains four reheater outlet and four superheater outlet headers, while the outer ring 37 comprises the four reheater inlet headers. The incoming gases, as in the FIGURE 5 arrangement, ascend an outer annulus 38 between the coils and the wall of an upper, increased diameter, portion of the penetration of the concrete pressure vessel.

Figure 7:
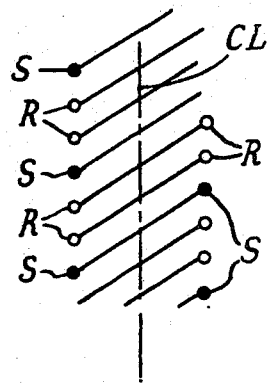
FIGURES 7, 8 and 9 show details of heat exchanger coil arrangements applicable to the above embodiments viewed on a section through the coil axes.
Figure 8:
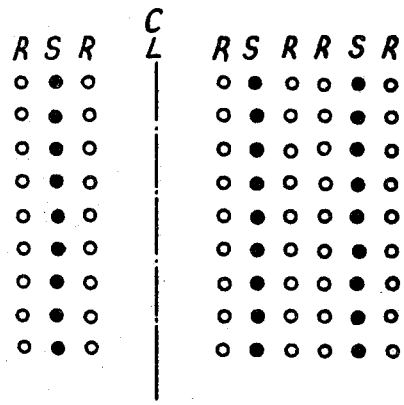
Figure 9:
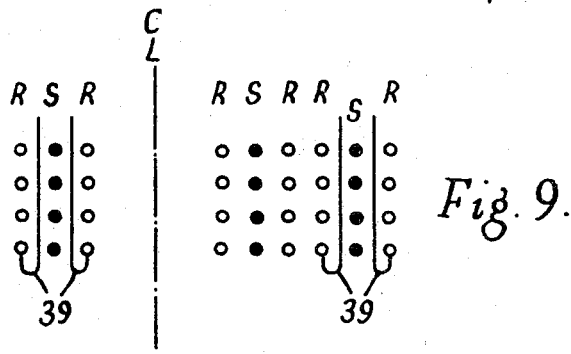

Referring again to FIGURE 5, the reheater 32 and superheater 35 may, instead of being wound separately as shown, be formed as a single combined unit with convolutions, or rows of convolutions, of the superheater coil interspersed with convolutions, or rows of convolutions, of the reheater coil. FIGURES 7, 8 and 9 show three optional ways of carrying out the combination. The embodiment shown in FIGURE 5, and these of FIGURES 4 and 6 may have the gas inlet located above all the tube banks, as those of FIGURES 2 and 3, so that no reversal of gas flow direction need occur within the cavity.

FIGURE 7 shows reheater turns R and superheater turns S included in a single column of convolutions. Crosssections of the reheater windings are shown as circles in outlines, those of the superheater are shown as filled in circles. The drawings show only part of a column and the heat exchanger would include several columns concentric with each other.

FIGURES 8 and 9 show arrangements which differ from the last in that the columns of convolutions of the reheater and superheater coils are separate, but interspersed. Accordingly each row of tubes as seen in these figures are designated R or S as appropriate.

These two arrangements differ in that in FIGURE 8, the reheater is wound both downwards and upwards, so that in half of the length of each winding, the water flow within is in the same direction as the flow of heating gases. In FIGURE 9, in contrast, the feed for the reheater tubes is supplied directly to the lower ends of the coil as indicated by the lines 39 and the coils wound upwardly from the feed inlets. In this way, almost all the length of a reheater flow path is traversed by water in the opposite direction to the gas flow. This advantage is obtained at some cost in simplicity over the FIGURE 8 arrangement.

Another advantage is that the straight reheaters inlets can be used to support the coils.

Referring again to FIGURES 4 to 6, there is a risk of the hot incoming gas passing down the annulus between the boiler casing and the liner insulation and thence leaking through a gas seal at the base of the boiler. To avoid this a bleed of cool gas is taken from the gas circulator discharge and led into the space between the gas seal and the liner insulation. Enough gas is bled to ensure an upward flow of gas in the annulus preventing hot gas reaching the lower portion of the insulation and the gas seal.

I claim:

1. A gas cooled nuclear reactor comprising a concrete pressure vessel formed by a concrete wall for containing the reactive core, a plurality of individually removable heat exchangers each fitted in a cylindrically-shaped penetration formed in the wall of said vessel from the outer surface thereof, the heat exchangers having tube banks substantially filling the penetrations for conducting a secondary coolant once-through the heat exchangers, the penetrations defining a plurality of mouths in said surface, each of said exchangers being provided with a closure that acts as a head therefor and closes the mouth of the penetration, each of said heat exchangers being individually removable from the penetration through the mouth thereof, means through which the gas may flow as the primary coolant between the reactive core and the heat exchangers, inlet and outlet tubes passing from each penetration to the exterior of the vessel by which to conduct the secondary coolant through the heat exchangers for conveying the heat of reaction from the vessel, the heat exchangers each spaced from the wall of its respective penetration forming an annular gas flow space, a circulating fan to circulate the primary coolant within the penetrations, and wherein the tubes are all substantially spiral tubes arranged within the penetration such that the axially inner portion of each penetration contains a central superheater tube bank surrounded by an economizer tube bank array, and the outer portion of the penetration contains evaporator tube banks, the arrangement being that secondary coolant entering the heat exchanger via the inlet tube passes through the tubes of first the economizer array, then the evaporator banks and finally the superheater bank before flowing out through the outlet tube.

2. A nuclear reactor according to claim 1 including gas path defining means to lead the heated gas from the reactor core first axially along the inner portion of the penetration, to reversed direction at or near the closure and then to return along the outer portion of the penetration towards the core again, whereby the gas flow in thermal contact with the tube banks is substantially opposed in direction to the secondary coolant flow.

3. A gas cooled nuclear reactor comprising a concrete pressure vessel formed by a concrete wall for containing the reactive core, a plurality of individually removable heat exchangers each fitted in a cylindrically-shaped penetration formed in the wall of said vessel from the outer surface thereof, the heat exchangers having tube banks substantially filling the penetrations for conducting a secondary coolant once-through the heat exchangers, the penetrations defining a plurality of mouths in said surface, each of said exchangers being provided with a closure that acts as a head therefor and closes the mouth of the penetration, each of said heat exchangers being individually removable from the penetration through the mouth thereof, means through which the gas may flow as the primary coolant between the reactive core and the heat exchangers, inlet and outlet tubes passing from each penetration to the exterior of the vessel by which to conduct the secondary coolant through the heat exchangers for conveying the heat of reaction from the vessel, the heat exchangers each spaced from the wall of its respective penetration forming an annular gas flow space, a circulating fan to circulate the primary coolant within the penetrations, and wherein each of said penetrations extends through the pressure vessel wall, the penetrations are regularly spaced around the circumference of the pressure vessel, and the fan is a centrifugal fan and is disposed in a cavity in the pressure vessel wall below the heat exchanger penetrations for circulating the primary coolant through the heat exchanges and then through the annular spaces.

4. A gas cooled nuclear reactor comprising a concrete pressure vessel formed by a concrete wall for containing the reactive core, a plurality of individually removable heat exchangers each fitted in a cylindrically-shaped penetration formed in the wall of said vessel from the outer surface thereof, the heat exchangers having tube banks substantially filling the penetrations for conducting a secondary coolant once-through the heat exchangers, the penetrations defining a plurality of mouths in said surface, each of said exchangers being provided with a closure that acts as a head therefor and closes the mouth of the penetration, each of said heat exchangers being individually removable from the penetration through the mouth thereof, means through which the gas may flow as the primary coolant between the reactive core and the heat exchangers, inlet and outlet tubes passing from each penetration to the exterior of the vessel by which to conduct the secondary coolant through the heat exchangers for conveying the heat of reaction from the vessel, the heat exchangers each spaced from the walls of its respective penetration forming an annular gas flow space, a circulating fan to circulate the primary coolant within the penetrations, and each heat exchanger is contained within a casing having an upper end and a lower end, the upper end of the casing rests on the wall of the penetration and the lower end thereof is spaced apart from the penetration to provide an annular return flow path for primary coolant gases after passage through the heat exchanger to protect the wall from hot primary gas, and the circulating fan is a centrifugal fan.

5. A nuclear reactor according to claim 4 including a single duct connecting each penetration with the interior of the pressure vessel, and tubing within each duct to provide two gas paths extending one through the other, the tubing connecting the heat exchanger with a region above the core in which heated gas therefrom collects, and the flow path outside the tubing being connected with said annular interval in the penetration.

6. A nuclear reactor according to claim 5, wherein each penetration is generally upright and having at the bottom thereof the nozzle of the centrifugal fan for initiating gas flow through first the inner path of the duct, then the heat exchanger, then back along the annular interval and then along the outer jacket to return to the core, and the gas flow is such that the concrete around the gas passes is protected from thermal contact with hot gases by an outer layer of cooler gases.

7. A nuclear reactor according to claim 5 including telescopic expansion joints in the tubing within said duct, and an adjustable vane regulator is provided in the gas flow path.

8. A gas cooled nuclear reactor comprising a concrete pressure vessel formed by a concrete wall for containing the reactive core, a plurality of individually removable heat exchangers each fitted in a cylindrically-shaped penetration formed in the wall of said vessel from the outer surface thereof, the heat exchangers having tube banks substantially filling the penetrations for conducting a secondary coolant once-through the heat exchangers, the penetrations defining a plurality of mouths in said surface, each of said exchangers being provided with a closure that acts as a head therefor and closes the mouth of the penetration, each of said heat exchangers being individually removable from the penetration through the mouth thereof, means through which the gas may flow as the primary coolant between the reactive core and the heat exchangers, inlet and outlet tubes passing from each penetration to the exterior of the vessel by which to conduct the secondary coolant through the heat exchangers for conveying the heat of reaction from the vessel, the heat exhangers each spaced from the wall of its respective penetration forming an annular gas flow space, a circulating fan to circulate the primary coolant within the penetrations, and including a reheater header carried by the closure, reheater coil connected to the header and disposed within the penetration for first heating incoming primary coolant before passage through the exchanger, and said reheater coils are substantially helically wound coils.

References Cited

UNITED STATES PATENTS

| | | | |
|---|---|---|---|
| 2,946,732 | 7/1960 | Wooton. | |
| 3,091,582 | 5/1963 | Bradley | 176—60 |
| 3,098,468 | 7/1963 | Huet | 122—32 |
| 3,105,805 | 10/1963 | Rodwell | 176—60 |
| 3,154,473 | 10/1964 | Martin | 176—60 |
| 3,182,002 | 5/1965 | Laithwaite et al. | 176—65 |
| 3,371,017 | 2/1968 | Coast et al. | 176—87 |

FOREIGN PATENTS

| | | |
|---|---|---|
| 1,355,064 | 2/1964 | France. |
| 866,037 | 4/1961 | Great Britain. |
| 1,024,243 | 3/1966 | Great Britain. |
| 287,871 | 2/1965 | Netherlands. |

REUBEN EPSTEIN, *Primary Examiner.*